(12) United States Patent
Milligan

(10) Patent No.: US 11,140,426 B2
(45) Date of Patent: Oct. 5, 2021

(54) STREAMING MEDIA MULTIPLEXING WITH A MEDIA PROXY

(71) Applicant: Control4 Corporation, Salt Lake City, UT (US)

(72) Inventor: Thomas Allen Milligan, Herriman, UT (US)

(73) Assignee: Snap One, LLC, Salt Lake City, UT (US)

(*) Notice: Subject to any disclaimer, the term of this patent is extended or adjusted under 35 U.S.C. 154(b) by 39 days.

(21) Appl. No.: 16/508,780

(22) Filed: Jul. 11, 2019

(65) Prior Publication Data

US 2020/0021861 A1 Jan. 16, 2020

Related U.S. Application Data

(60) Provisional application No. 62/697,528, filed on Jul. 13, 2018.

(51) Int. Cl.
*H04W 4/10* (2009.01)
*H04N 21/2368* (2011.01)
*H04L 29/06* (2006.01)

(52) U.S. Cl.
CPC ....... *H04N 21/2368* (2013.01); *H04L 65/105* (2013.01); *H04L 65/1006* (2013.01); *H04L 65/601* (2013.01)

(58) Field of Classification Search
None
See application file for complete search history.

(56) References Cited

U.S. PATENT DOCUMENTS

| 8,208,413 | B1* | 6/2012 | Bienn | H04Q 3/005 370/271 |
| 9,674,140 | B1* | 6/2017 | Ivov | H04L 67/42 |
| 2004/0059942 | A1* | 3/2004 | Xie | H04L 61/2521 726/12 |
| 2004/0131042 | A1* | 7/2004 | Lillie | H04L 12/1822 370/351 |
| 2007/0019631 | A1* | 1/2007 | Jang | H04L 29/06027 370/352 |
| 2009/0238168 | A1* | 9/2009 | Lavoie | H04L 65/1006 370/352 |
| 2015/0223031 | A1* | 8/2015 | Denman | H04W 4/10 370/328 |
| 2016/0380966 | A1* | 12/2016 | Gunnalan | H04L 61/2589 709/226 |
| 2017/0238152 | A1* | 8/2017 | Patel | H04L 65/1006 370/312 |
| 2017/0264929 | A1* | 9/2017 | Ahn | H04N 21/23608 |
| 2018/0054468 | A1* | 2/2018 | Whynot | H04L 65/105 |

* cited by examiner

*Primary Examiner* — Sithu Ko
(74) *Attorney, Agent, or Firm* — Austin Rapp

(57) ABSTRACT

A method for communicating from one device to a plurality of receiving devices using a media multiplexer with a media proxy is described. A request for a call by the one device is received at the media multiplexer. Communication channels are allocated on the media proxy by the media multiplexer. A communication channel is allocated for each of the plurality of receiving devices. Media from the one device is received by the media multiplexer. The received media is sent to each of the plurality of receiving devices using the allocated communication channels.

8 Claims, 7 Drawing Sheets

US 11,140,426 B2

STREAMING MEDIA MULTIPLEXING WITH A MEDIA PROXY

RELATED APPLICATIONS

This application is related to and claims priority from U.S. Provisional Patent Application No. 62/697,528, filed Jul. 13, 2018, for "STREAMING MEDIA MULTIPLEXING WITH A MEDIA PROXY," which is hereby incorporated by reference in its entirety.

TECHNICAL FIELD

The present disclosure relates generally to electronic devices. More specifically, the present disclosure relates to systems and methods for streaming media distributed by a media multiplexer with a media proxy to multiple receivers.

BACKGROUND

In recent years, the price of electronic devices has decreased dramatically. In addition, the types of electronic devices that can be purchased have continued to increase. For example, laptop computers, tablets, smart phones, DVD players, large screen TVs, multi-carousel CD and DVD players, MP3 players, video game consoles and similar consumer electronic items have become more widely available while continuing to drop in price.

The decreasing prices and increasing types of electronic components have packed today's homes and businesses with modern conveniences. Typical homes and businesses now include more electronic devices than ever before. While these electronic devices may provide convenience and entertainment, many also require control. Moreover, these electronic devices consume electrical power and may consume other resources.

Many electronic devices today have the ability to communicate with other electronic devices over different kinds of networks. In certain circumstances it is desirable to communicate from one device to multiple devices.

DETAILED DESCRIPTION

Figure 1:
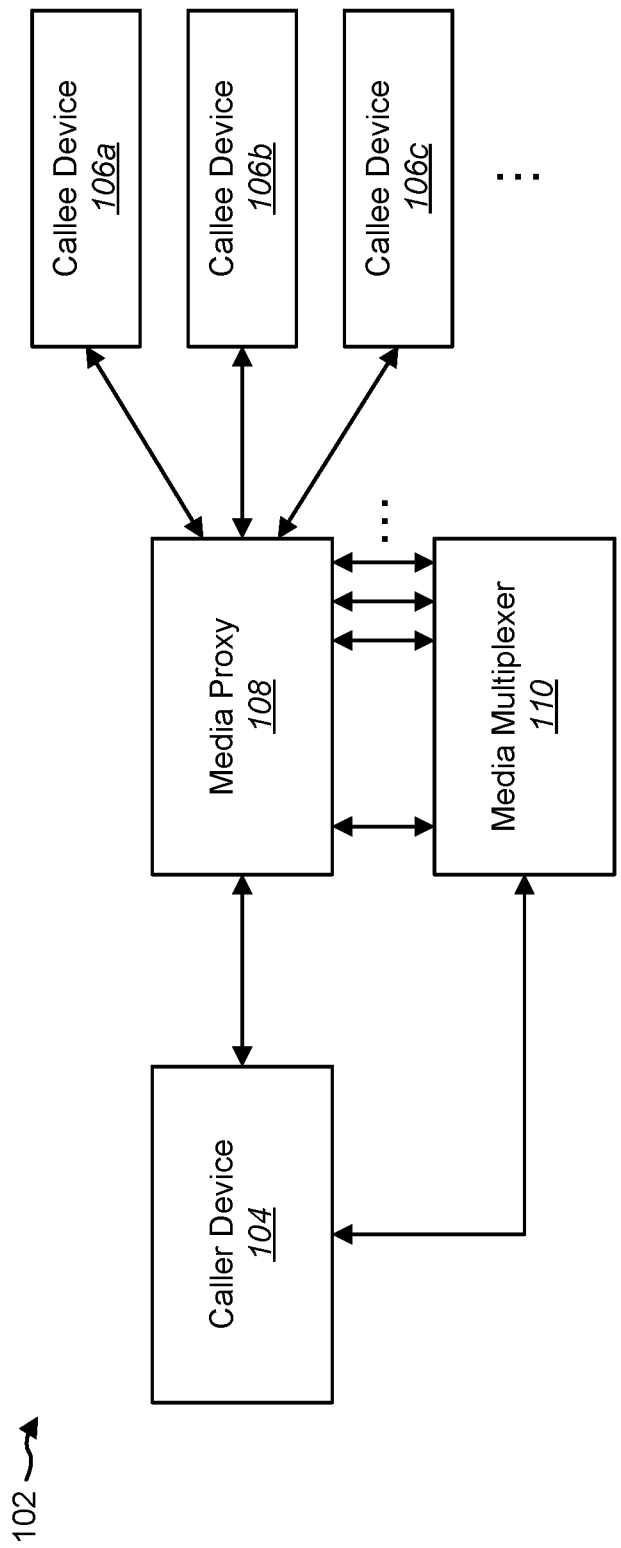
FIG. 1 is a block diagram of a system for communicating from a caller device to a plurality of callee devices using a media proxy and a media multiplexer.

A method for communicating from one device to a plurality of receiving devices using a media proxy is described. The method includes receiving a request at a media multiplexer for a call by the one device. The method also includes allocating communication channels on the media proxy. A communication channel is allocated for each of the plurality of receiving devices. The method further includes receiving media from the one device by the media multiplexer. The method additionally includes sending the media received to each of the plurality of receiving devices using the allocated communication channels.

The method may also include receiving callee media from the plurality of receiving devices via the allocated communication channels by the media multiplexer. The callee media may be sent to the one device by the media multiplexer using the media proxy.

The method may also include receiving at the media multiplexer a request for exclusive streaming by a previous receiving device of the plurality of receiving devices. All of the allocated communication channels may be closed except for the communication channel being used by the previous receiving device.

A media multiplexer for communicating from one device to a plurality of receiving devices using a media proxy is also described. The media multiplexer includes a processor, a memory in electronic communication with the processor, and instructions stored in the memory. The instructions are executable by the processor to receive a request at the media multiplexer for a call by the one device. The instructions are also executable to allocate communication channels on the media proxy. A communication channel is allocated for each of the plurality of receiving devices. The instructions are further executable to receive media from the one device by the media multiplexer. The instructions are additionally executable to send the media received to each of the plurality of receiving devices using the allocated communication channels.

Another method for communicating from one device to a plurality of receiving devices using a media proxy is described. The method includes receiving a request for a one-to-many call from a caller device to a plurality of callee devices. The method also includes creating a caller port by the media multiplexer to receive media from the caller device. The method further includes creating a receiving port to receive media from the plurality of callee devices. The method additionally includes allocating a port by the media multiplexer on a media proxy for sending media to the caller device. The method also includes allocating a port by the media multiplexer on the media proxy for each of the plurality of callee devices that directs media to the media multiplexer. The method further includes forwarding the request to each of the plurality of callee devices using a unique port for each callee device. The method additionally includes answering the call by each of the plurality of callee devices using the port for receiving media on. The method also includes allocating a port by the media multiplexer on a media proxy for each callee answer. The port allocated is used to forward media to the associated callee device. The method further includes allocating a port by the media multiplexer on the media proxy. The port allocated directs caller media to the media multiplexer. The method additionally includes notifying the caller device of the port on the media proxy to send media to the media multiplexer.

Another media multiplexer for communicating from one device to a plurality of receiving devices using a media proxy is described. The media multiplexer receives a request for a one-to-many call from a caller device to a plurality of callee devices. The media multiplexer creates a caller port to receive media from the caller device. The media multiplexer creates a receiving port to receive media from the plurality of callee devices. The media multiplexer allocates a port by the media multiplexer on a media proxy for sending media to the caller device. The media multiplexer allocates a port by the media multiplexer on the media proxy for each of the plurality of callee devices that directs media to the media multiplexer. The media multiplexer forwards the request to each of the plurality of callee devices using a unique port for each callee. The media multiplexer answers the call by each of the plurality of callee devices using the port for receiving media on. The media multiplexer allocates a port by the media multiplexer on a media proxy for each callee answer. The port allocated is used to forward media to the associated callee device. The media multiplexer allocates a port by the media multiplexer on the media proxy. The port allocated directs caller media to the media multiplexer. The media multiplexer notifies the caller device of the port on the media proxy to send media to the media multiplexer.

Sending a media stream to an endpoint that is behind a firewall can be facilitated with a media proxy. Media proxies provide public network access ports where media can be sent and then forwarded by the media proxy to the intended recipient. If the stream is intended for multiple recipients, then a media multiplexer may be used in conjunction with a media proxy to forward the media. To support multiple receivers, when a media proxy receives media, the media is forwarded to a media multiplexer, which subsequently forwards the media back to multiple media proxy ports for distribution to the group of intended recipients. The present systems and methods describe the process and procedures that allow a media proxy and media multiplexer to collaboratively distribute a media stream to a group of recipients.

One possible use case is the scenario where there is a camera by the front door of a home that is activated whenever someone rings the doorbell. When someone rings the doorbell, media is sent out, but it needs to be sent to all devices in the group that is associated with the doorbell. The devices in the group may be at various locations depending on where the users of the devices are located. For example, the devices could be at home, or at work, travelling, etc. With the present systems and methods, all devices that are associated with the front door doorbell group may see the doorbell alert and image and/or video. A method is also provided where one specific device can answer the door.

The following terms are used in the present description. Definitions for how these terms are used herein are provided as follows:

Port—Network communication port that is identified by network host address and a port number.

Network Service—A process that runs on a public network host that provides a network application programming interface (API) using network communications.

Media Stream—audio, video, or other media formats that change data over time that must be continually updated.

Media Proxy—Network service that provides public network ports where media can be sent and then forwarded to the intended recipient. The sender and receiver agree on public ports since they cannot always communicate directly.

Media Multiplexer—Network service that maps a single media stream source to multiple target destinations.

SIP—Session Initiation Protocol, which may be used for signaling and controlling multimedia communication sessions.

SDP—Session Description Protocol, which may be used to define the media formats, media attributes, and media port locations.

Various configurations are now described with reference to the figures, where like reference numbers may indicate functionally similar elements. The systems and methods as generally described and illustrated in the figures herein could be arranged and designed in a wide variety of different configurations. Thus, the following more detailed description of several configurations, as represented in the Figures, is not intended to limit scope, as claimed, but is merely representative of the systems and methods. As used herein, the term "plurality" may indicate two or more. For example, a plurality of components may refer to two or more components.

FIG. 1 is a block diagram of a system 102 for communicating from a caller device 104 to a plurality of callee devices 106a, 106b, 106c using a media proxy 108 and a media multiplexer 110. The caller device 104, callee devices 106a-c, media proxy 108 and media multiplexer 110 may be electronic devices. Examples of electronic devices include home controllers, audio/video receivers, servers, computers (e.g., desktop computers, laptop computers, etc.), network devices, gaming consoles, smart televisions, smartphones, tablet devices, vehicles, automobiles, aircraft, appliances, etc. In some configurations, the electronic device may be located in a building, home, business, vehicle, etc., and/or may be integrated into one or more devices (e.g., vehicles, mobile devices, etc.). The electronic device may include one or more components or elements. One or more of the components or elements may be implemented in hardware (e.g., circuitry), a combination of hardware and software (e.g., a processor with instructions), and/or a combination of hardware and firmware.

In some configurations, an electronic device (e.g., caller device 104, callee devices 106, media proxy 108 and/or media multiplexer 110) may include a processor, a memory, and/or one or more communication interfaces. The processor may be coupled to (e.g., in electronic communication with) the memory and/or communication interface(s).

In some configurations, an electronic device (e.g., caller device 104, callee devices 106, media proxy 108 and/or media multiplexer 110) may be configured to perform one or more of the functions, procedures, methods, steps, etc., described in connection with one or more of FIGS. 1-7. Additionally or alternatively, an electronic device may include one or more of the structures described in connection with one or more of FIGS. 1-7.

The media multiplexer 110 may perform call management by setting up calls, receiving data and forwarding the data where it needs to go. In some implementations, the media multiplexer 110 may receive a request for a call from the caller device 104. For example, the call may indicate media that is to be communicated with a number of callee devices 106a-c. In some cases, the call may be sent to establish a media stream from the caller device 104 to the callee devices 106a-c.

Upon receiving the call, the media multiplexer 110 may allocate communication channels on the media proxy 108. As used herein, a communication channel may be a port used to communicate with an electronic device over a network. The media multiplexer 110 may allocate a communication channel on the media proxy 108 for each of the callee devices 106a-c. For example, a first communication channel may facilitate communication between a first callee device 106a and the media proxy 108, a second communication channel may facilitate communication between a second callee device 106b and the media proxy 108, and so forth.

The media multiplexer 110 may receive media (e.g., a media stream) from the caller device 104. For example, the caller device 104 may send the media to the media multiplexer 110. In another example, the caller device 104 may send the media to the media proxy 108, which forwards the media to the media multiplexer 110.

Upon receiving the media, the media multiplexer 110 may send the media to each of the callee devices 106a-c (receiving devices) using the communication channels allocated on the media proxy 108. For example, the media multiplexer 110 may send the media to the first callee device 106a using the first communication channel on the media proxy 108. The media multiplexer 110 may send the media to the second callee device 106b using the second communication channel on the media proxy 108, and so forth.

In some examples, media may also be received from the callee devices 106a-c via the allocated communication channels on the media proxy 108. For example, a callee device 106 may send media to the media proxy 108 via the allocated communication channel. The media proxy 108 may then forward the media from the callee device 106 to the media multiplexer 110. The media multiplexer 110 may send the received media to the caller device 104 using the media proxy 108.

In some cases, one of the callee devices 106a-c may request exclusive streaming. When exclusive streaming is requested the media multiplexer 110 may close all of the allocated communication channels except for the communication channel being used by the callee device 106 that requested exclusive streaming.

In some examples, the media proxy 108 and media multiplexer 110 may both be cloud services. For instance, the media proxy 108 and media multiplexer 110 may communicate with the caller device 104 and/or callee devices 106a-c over the Internet.

Figure 2:
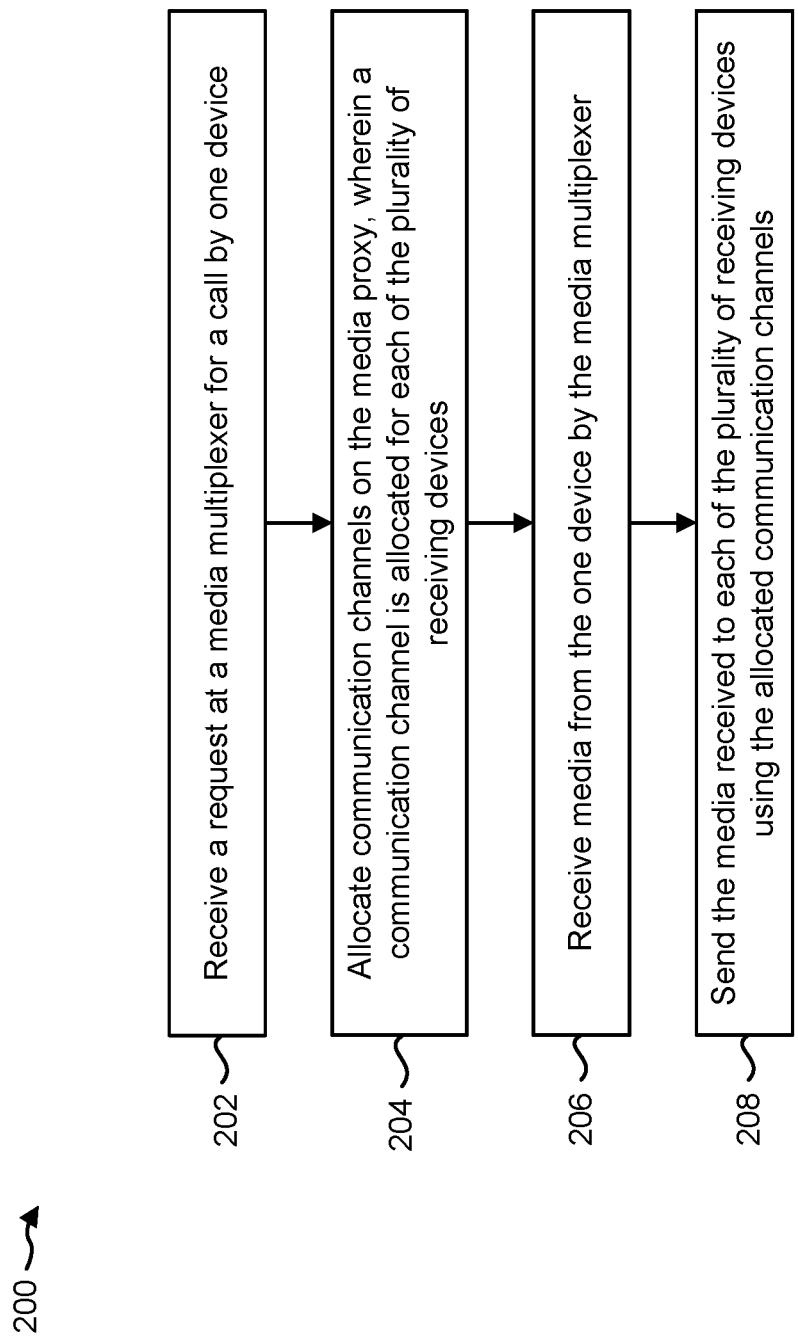
FIG. 2 is a flow diagram illustrating one configuration of a method for communicating from one device to a plurality of receiving devices using a media proxy and a media multiplexer.

FIG. 2 is a flow diagram 200 illustrating one configuration of a method for communicating from one device (e.g., a caller device 104) to a plurality of receiving devices (e.g., callee devices 106a-c) using a media proxy 108 and a media multiplexer 110. A request for a call, sent by the one device 104, may be received 202 by a media multiplexer 110. The call may indicate a number of receiving devices (e.g., callee devices 106a-c) that are to receive the call.

The media multiplexer 110 may allocate 204 communication channels on the media proxy 108 for the plurality of receiving devices (e.g., callee devices 106a-c). A communication channel may be allocated on the media proxy 108 for each of the plurality of receiving devices 106a-c.

Media may be received 206 from the one device 104 by the media multiplexer 110. For example, the one device 104 may send the media to the media multiplexer 110. In another example, the one device 104 may send the media to the media proxy 108, which forwards the media to the media multiplexer 110.

The received media may be sent 208 to each of the plurality of receiving devices 106a-c using the allocated communication channels. For example, the media multiplexer 110 may send 208 the media to the first receiving device 106a using the first communication channel on the media proxy 108. The media multiplexer 110 may send the media to the second receiving device 106b using the second communication channel on the media proxy 108, and so forth.

In some examples, the media multiplexer 110 may receive callee media from the plurality of receiving devices via the allocated communication channels by the media multiplexer. The media multiplexer 110 may send the callee media to the one device using the media proxy 108.

In some examples, the media multiplexer 110 may receive a request for exclusive streaming by a previous receiving device of the plurality of receiving devices. The media multiplexer 110 may close all of the allocated communication channels except for the communication channel being used by the previous receiving device.

Figure 3:
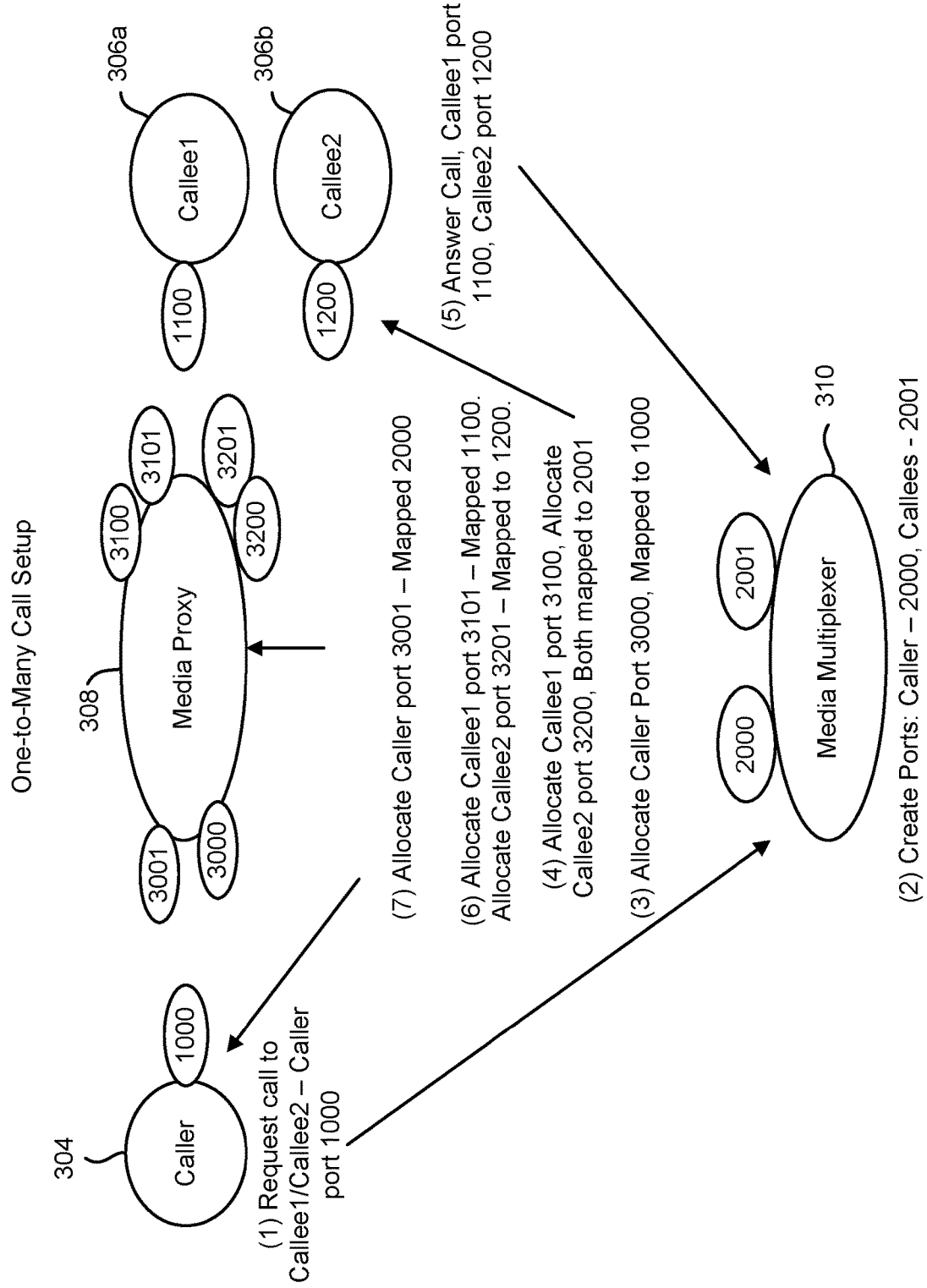
FIG. 3 is a block diagram illustrating one configuration of a system for a one-to-many call setup.

FIG. 3 is a block diagram illustrating one configuration of a system for a one-to-many call setup. In this example, a call may be set up between a single caller device 304 (e.g., Caller) and multiple callee devices 306a-b (e.g., Callee1, Callee2, etc.).

In a first step (1), the caller device 304 may request a one-to-many call and specifies the caller port 1000 to receive the media. For example, the caller device 304 may send the call request to the media multiplexer 310. In this step, the caller device 304 may communicate the call request and caller port 1000 to the media multiplexer 310.

In a second step (2), the media multiplexer 310 may create a port 2000 to receive media from the caller device 304. The media multiplexer 310 may also create a port 2001 to receive media from the callee devices 306a-b.

In a third step (3) the media multiplexer 310 may allocate a port 3000 on a media proxy 308 for sending media to the caller device 304. In this case, the caller port 3000 of the media proxy 308 may be mapped to the caller port 1000 of the caller device 304.

In a fourth step (4), the media multiplexer 310 may allocate a port on the media proxy 308 for each callee device 306 that directs media sent by a callee device 306 to the media multiplexer 310. For example, the media multiplexer 310 may allocate a port 3100 on the media proxy 308 to forward media sent by a first callee device (Callee1) 306a to the media multiplexer 310. The port 3100 may be mapped to port 2001 on the media multiplexer 310. The media multiplexer 310 may allocate a port 3200 on the media proxy 308 to forward media sent by a second callee device (Callee2) 306b to the media multiplexer 310. The port 3200 may also be mapped to port 2001 on the media multiplexer 310.

The media multiplexer 310 may then forward the call request with the unique port (e.g., port 3100 and 3200) for each callee device 306. For example, the media multiplexer 310 may forward the call request to the first callee device (Callee1) 306a that includes information about port 3100 on the media proxy 308. The media multiplexer 310 may also forward the call request to the second callee device (Callee2) 306b that includes information about port 3200 on the media proxy 308.

In a fifth step (5), each callee 306 may answer the call with the port that they can receive media on. For example, the first callee device (Callee1) 306a may answer the call by responding to the media multiplexer 310 with information about port 1100. In this case, port 1100 may be used by the media proxy 308 to send media to the first callee device (Callee1) 306a. The second callee device (Callee2) 306b may answer the call by responding to the media multiplexer 310 with information about port 1200. In this case, port 1200 may be used by the media proxy 308 to send media to the second callee device (Callee2) 306b.

In a sixth step (6), for each callee device 306 that answers, the media multiplexer 310 may allocate a port on the media proxy 308 that is used to forward media to the associated callee 306. For example, the media multiplexer 310 may allocate Callee1 port 3101 on the media proxy 308 that is mapped to port 1100 on the first callee device (Callee1) 306a. The media multiplexer 310 may allocate Callee2 port

3201 on the media proxy 308 that is mapped to port 1200 on the second callee device (Callee2) 306*b*.

In a seventh step (7), the media multiplexer 310 may allocate a port 3001 on the media proxy 308 that directs caller media to the media multiplexer 310. The port 3001 on the media proxy 308 may be mapped to port 2000 on the media multiplexer 310. The media multiplexer 310 may then notify the caller 304 of the port 3001 to send media to.

In some approaches, the signaling to set up the media streams may be implemented using Session Initiation Protocol (SIP), which may use Session Description Protocol (SDP). Using SIP with SDP, the devices (e.g., caller device 304, callee devices 306*a-b*, the media multiplexer 310 and/or media proxy 308) may negotiate how to communicate between the source and the client's endpoints.

Figure 4:
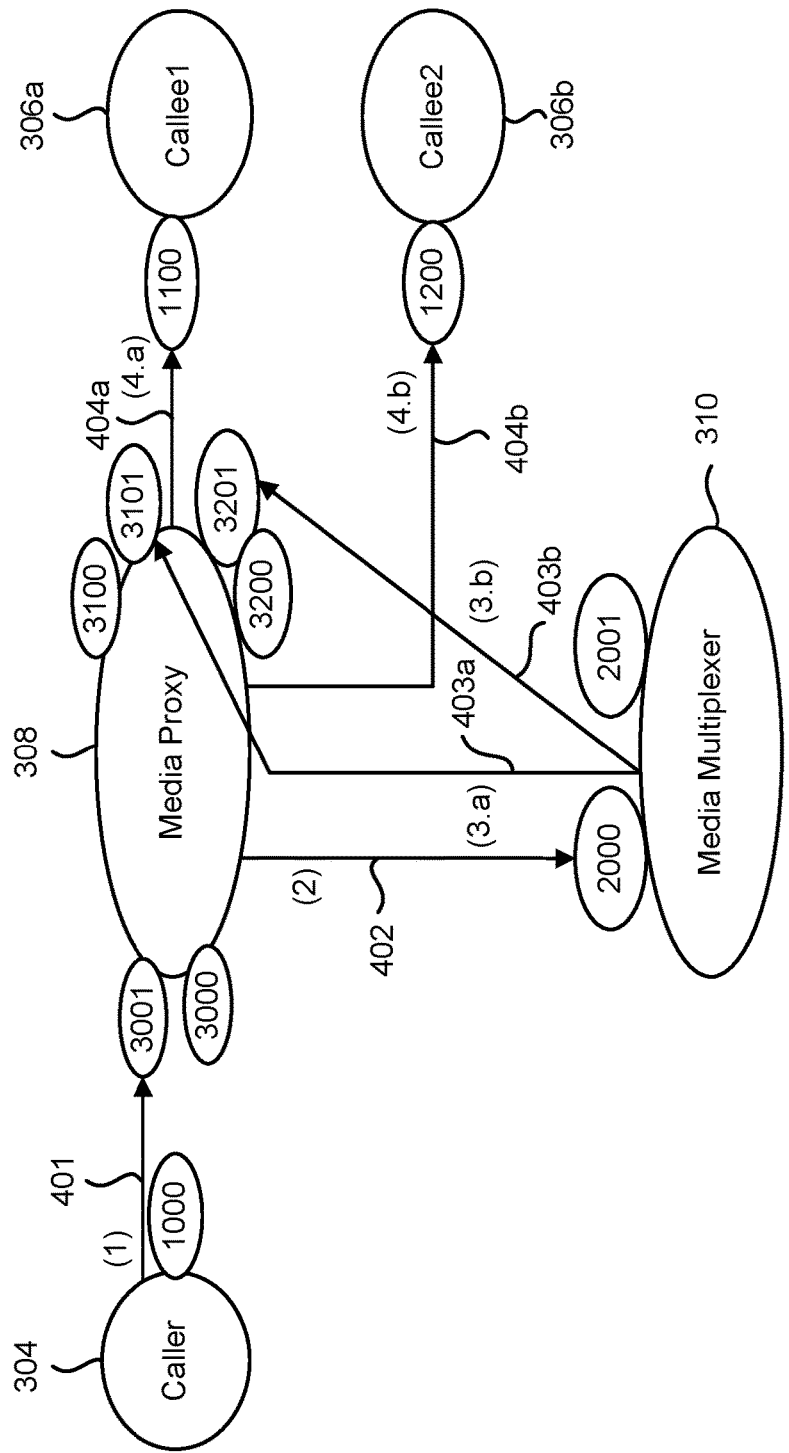
FIG. 4 is a block diagram illustrating one configuration of a media data flow for the one-to-many call discussed in relation to FIG. 3.

FIG. 4 is a block diagram illustrating one configuration of a media data flow for the one-to-many call discussed in relation to FIG. 3. In a first step (1), the media data starts at the caller device 304 and is sent 401 to the media proxy 308. For example, the caller device 304 may send media (e.g., a media stream) to port 3001 of the media proxy 308.

In a second step (2), the media data may be sent 402 to the media multiplexer 310. For example, because port 3001 of the media proxy 308 is mapped to port 2000 of the media multiplexer 310, the media proxy 308 may forward media received on port 3001 to port 2000 of the media multiplexer 310.

In a third step, the media multiplexer 310 may send the media data on two streams to the media proxy 308. For example, in step 3.*a*, the media multiplexer 310 may send 403*a* the media data on a first stream to port 3101 of the media proxy 308. In step 3.*b*, the media multiplexer 310 may send 403*b* the media data on a second stream to port 3201 of the media proxy 308.

In a fourth step, the media proxy 308 forwards the separate data streams to the callee devices 306*a*, 306*b*. For example, in step 4.*a*, the media proxy 308 may send 404*a* the media data to port 1100 of the first callee device (Callee1) 306*a* because port 3101 of the media proxy 308 is mapped to port 1100 of the first callee device (Callee1) 306*a*. In step 4.*b*, the media proxy 308 may send 404*b* the media data to port 1200 of the second callee device (Callee2) 306*b* because port 3201 of the media proxy 308 is mapped to port 1200 of the second callee device (Callee2) 306*b*.

It should be noted that the media data flow is shown in FIG. 4 along the flow from 401, 402, 403*a* & 403*b* and ending with 404*a* & 404*b*. In some implementations, the media multiplexer and/or the media proxy may handle a set of media streams as a single call and process the streams aggregately. For example, media streams originating from the caller device may be combined with media streams from the callee devices to form a single call.

In some implementations, the media proxy 308 may transcode the source media to different formats as requested by each recipient. For example, the media proxy 308 may transcode the media sent from the caller device 304 to a format that is compatible with a callee device 306.

In some implementations, the media proxy 308 may decrypt the media from the source's security context and encrypt the media for each recipient based on the receivers' security context. For example, the media proxy 308 may decrypt the media from the security context of the caller device 304 and may encrypt the media for a security context of a callee device 306.

Figure 5:
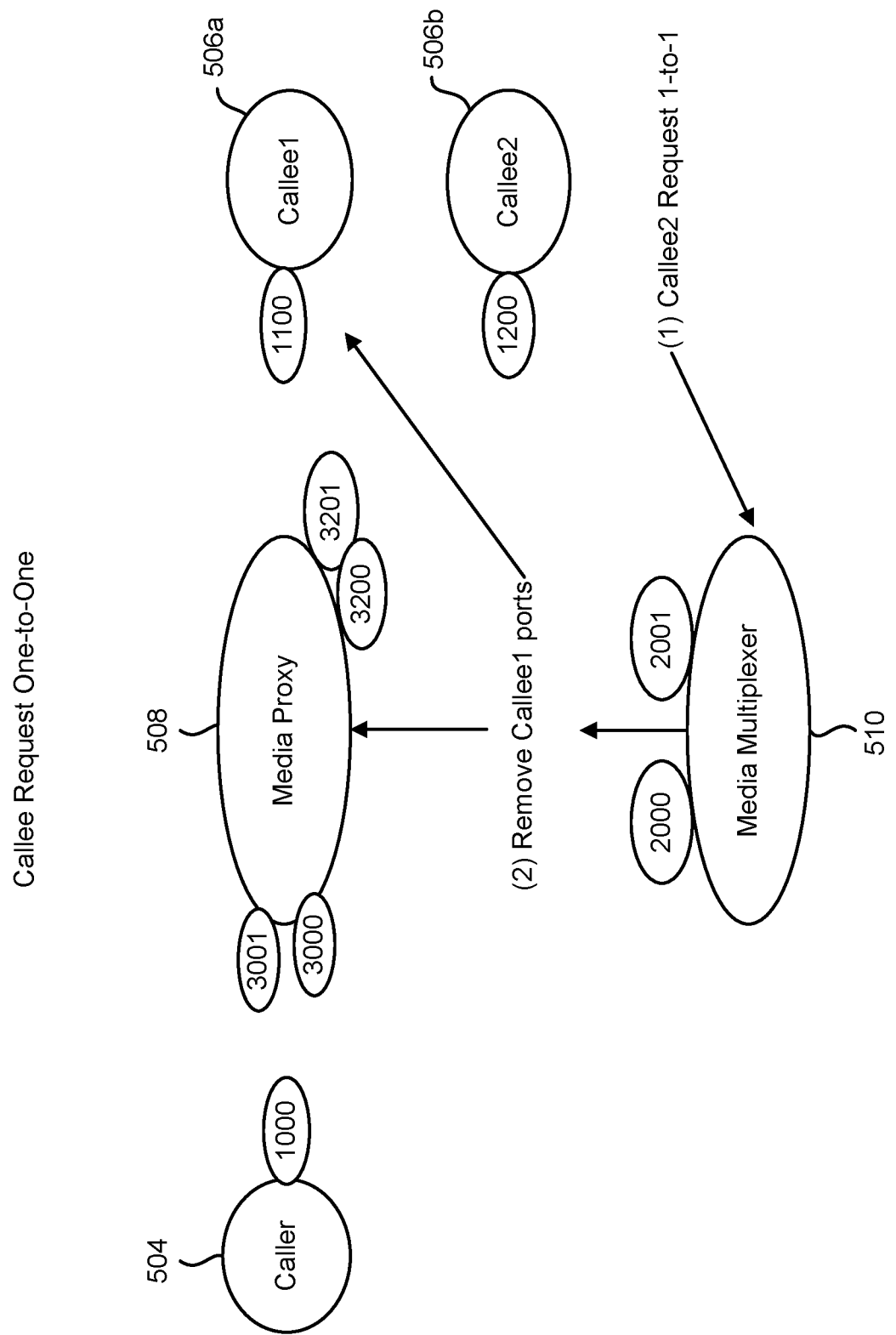
FIG. 5 is a block diagram illustrating one configuration of a system for a one-to-one call setup.

FIG. 5 is a block diagram illustrating one configuration of a system for a one-to-one call setup. It should be noted that the ports described in FIG. 5 may be allocated as described in FIG. 3. For example, a one-to-many call may be set up between the caller device 504 and the callee devices 506*a-b* as described in FIG. 3. The port numbering described in FIG. 5 corresponds to the port numbering of FIG. 3.

In a first step (1) of a one-to-one call setup, after the one-to-many call is setup, a member of the callee group 506*a*, 506*b* requests exclusive one-to-one media streaming with the caller device 504. In this example, the second callee device (Callee2) 506*b* requests a one-to-one call. The second callee device (Callee2) 506*b* may send the one-to-one call request to the media multiplexer 510.

In a second step (2), the media multiplexer 510 may remove all media ports on the media proxy 508 for the other callee devices. The media multiplexer 510 may also notify the other callee devices that their calls have been terminated. For example, upon receiving the one-to-one call request from the second callee device (Callee2) 506*b*, the media multiplexer 510 may remove port 3100 and port 3101 from the media proxy 508 for the first callee device (Callee1) 506*a*. The media multiplexer 510 may then notify the first callee device (Callee1) 506*a* that its call has been terminated.

Figure 6:
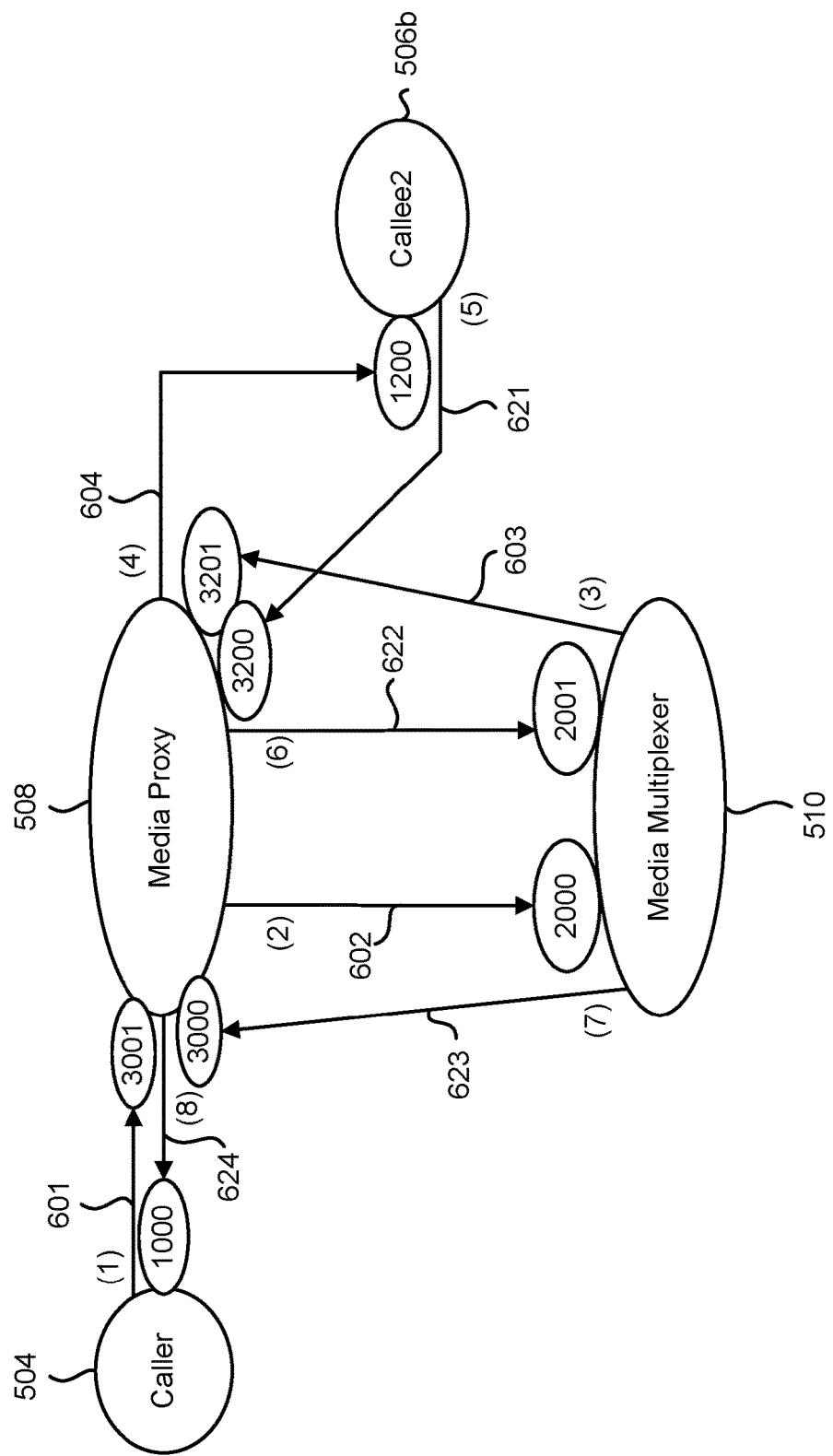
FIG. 6 is a block diagram illustrating one configuration of the media data flow for the one-to-one call discussed in relation to FIG. 5.

FIG. 6 is a block diagram illustrating one configuration of the media data flow for the one-to-one call discussed in relation to FIG. 5. The media data flowing from the caller device (Caller) 504 to the callee device (Callee2) 506*b* is shown along the pathway 601, 602, 603 and 604. The media data flowing from the callee device 506*b* to the caller 504 is shown along the pathway 621, 622, 623 and 624.

In a first step (1), the media data intended for the callee device (Callee2) 506*b* starts at the caller device 504 and is sent 601 to the media proxy 508. For example, the caller device 504 may send media (e.g., a media stream) to port 3001 of the media proxy 508.

In a second step (2), the media data may be sent 602 to the media multiplexer 510. For example, because port 3001 of the media proxy 508 is mapped to port 2000 of the media multiplexer 510, the media proxy 508 may forward media received on port 3001 to port 2000 of the media multiplexer 510.

In a third step (3), the media multiplexer 510 may send the media data on a stream to the media proxy 508. For example, the media multiplexer 510 may send 603 the media data on a stream to port 3201 of the media proxy 508.

In a fourth step (4), the media proxy 508 may forward the data stream to the callee device 506*b*. For example, the media proxy 508 may send 604 the media data to port 1200 of the callee device (Callee2) 506*b* because port 3201 of the media proxy 508 is mapped to port 1200 of the callee device (Callee2) 506*b*.

In a fifth step (5), the callee device (Callee2) 506*b* may send 621 media to the media proxy 508. For example, the callee device (Callee2) 506*b* may send 621 the media data to port 3200 of the media proxy 508. It should be noted that media sent from the callee device 506 to the caller device 504 may be referred to as "callee media."

In a sixth step (6), the media data may be sent 622 to the media multiplexer 510. For example, because port 3200 of the media proxy 508 is mapped to port 2001 of the media multiplexer 510, the media proxy 508 may forward media received on port 3200 to port 2001 of the media multiplexer 510.

In a seventh step (7), the media multiplexer 510 may send the media data on a stream to the media proxy 508. For example, the media multiplexer 510 may send 623 the media data on a stream to port 3000 of the media proxy 508.

In an eighth step (8), the media proxy 508 forwards the data stream to the caller device 504. For example, the media proxy 508 may send 624 the media data to port 1000 of the caller device 504 because port 3000 of the media proxy 508 is mapped to port 1000 of the caller device 504.

In some implementations, the media proxy 508 may transcode the source media to different formats as requested by the callee device 506b. In some implementations, the media proxy 508 may decrypt the media from the security context of the caller device 504 and may encrypt the media for a security context of the callee device 506b.

The electronic devices herein may also be referred to as computing devices. Examples of computing devices include desktop computers, laptop computers, tablet devices, netbooks, cellular phones, smart phones, smart watches, routers, personal digital assistants (PDAs), thermostats, controllers, sensors, actuators, etc.

Various devices described herein may be configured to communicate with or be part of the cloud. As used herein, the term "cloud" refers to an Internet-based computing network of one or more remote servers.

Figure 7:
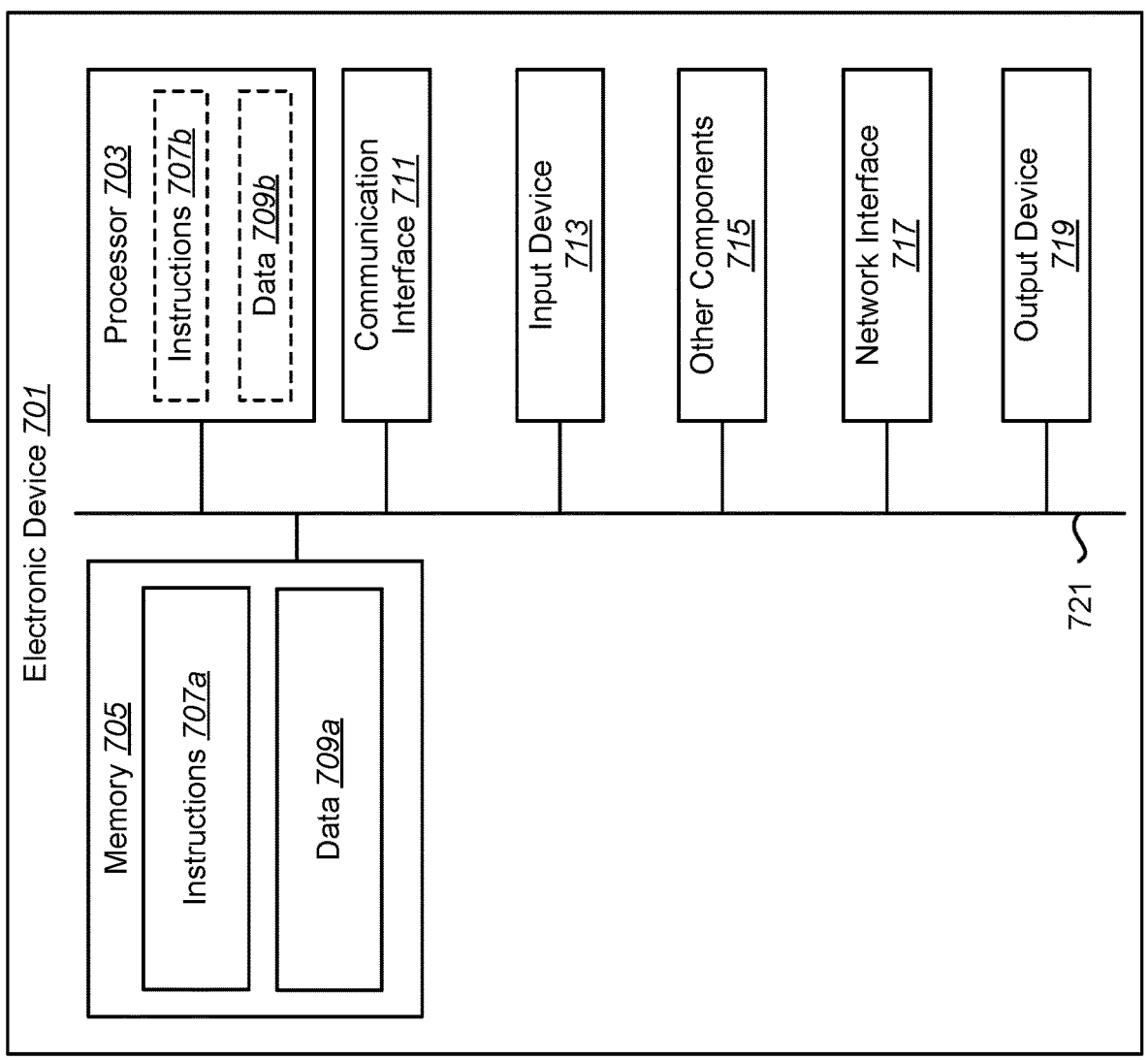
FIG. 7 is a block diagram illustrating various components that may be utilized in an electronic device.

FIG. 7 is a block diagram illustrating various components that may be utilized in an electronic device. Examples of electronic devices include a caller device, callee device, media proxy and media multiplexer as described herein.

An electronic device may include a broad range of digital computers, including microcontrollers, hand-held computers, personal computers, servers, mainframes, supercomputers, minicomputers, workstations and any variation or related device thereof. In some configurations, the electronic device may be an appliance. Additionally or alternatively, the electronic device may be an embedded device inside an otherwise complete device (e.g., within an appliance).

The electronic device 701 is shown with a processor 703 and memory 705. The processor 703 may control the operation of the electronic device 701 and may be embodied as a microprocessor, a microcontroller, a digital signal processor (DSP) or other device known in the art. The processor 703 typically performs logical and arithmetic operations based on program instructions 707a and/or data 709a stored within the memory 705. The instructions 707a in the memory 705 may be executable to implement the methods described herein. FIG. 8 illustrates instructions 707b and/or data 709b being loaded onto the processor 703. The instructions 707b and/or data 709b may be the instructions 707a and/or data 709a (or portions thereof) stored in memory 705.

The electronic device 701 may also include one or more communication interfaces 711 and/or network interfaces 717 for communicating with other electronic devices. The communication interface(s) 711 and the network interface(s) 717 may be based on wired communication technology and/or wireless communication technology, such as ZigBee®, WiMax®, WiFi®, Bluetooth® and/or cellular protocols, such as GSM®, etc.

The electronic device 701 may also include one or more input devices 713 and one or more output devices 719. The input devices 713 and output devices 719 may facilitate user input/user output. Other components 715 may also be provided as part of the electronic device 701.

Instructions 707a and data 709a may be stored in the memory 705. The processor 703 may load and execute instructions 707b from the instructions 707a in memory 705 to implement various functions. Executing the instructions 707a may involve the use of the data 709a that is stored in the memory 705. The instructions 707b and/or data 709b may be loaded onto the processor 703. The instructions 707 are executable to implement the one or more methods shown herein and the data 709 may include one or more of the various pieces of data described herein.

The memory 705 may be any electronic component capable of storing electronic information. The memory 705 may be embodied as random access memory (RAM), read-only memory (ROM), magnetic disk storage media, optical storage media, flash memory devices in RAM, on-board memory included with the processor, EPROM memory, EEPROM memory, an ASIC (Application Specific Integrated Circuit), registers and so forth, including combinations thereof. The various components of the electronic device may be coupled together by a bus system 721, which may include a power bus, a control signal bus and a status signal bus, in addition to a data bus. However, for the sake of clarity, the various buses are illustrated in FIG. 7 as the bus system 721.

In the above description, reference numbers have sometimes been used in connection with various terms. Where a term is used in connection with a reference number, it may refer to a specific element that is shown in one or more of the Figures. Where a term is used without a reference number, it may refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable or processor-readable statement(s). For example, the terms "instructions" and "code" may refer to one or more programs, routines, sub-routines, functions, procedures, etc.

"Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium may be tangible and non-transitory. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for communicating from one device to a plurality of receiving devices using a media proxy, comprising:
   receiving a request, sent from the one device, at a media multiplexer for a call by the one device;
   allocating communication channels on the media proxy, wherein a communication channel is allocated for each of the plurality of receiving devices;
   receiving media from the one device by the media multiplexer;
   sending the media received to each of the plurality of receiving devices using the allocated communication channels;
   receiving at the media multiplexer a request for exclusive streaming by a previous receiving device of the plurality of receiving devices; and
   closing all of the allocated communication channels except for the communication channel being used by the previous receiving device.

2. The method of claim 1, further comprising receiving callee media from the plurality of receiving devices via the allocated communication channels by the media multiplexer.

3. The method of claim 2, further comprising sending the callee media to the one device by the media multiplexer using the media proxy.

4. A media multiplexer for communicating from one device to a plurality of receiving devices using a media proxy, comprising:
   a processor;
   a memory in electronic communication with the processor; and
   instructions stored in the memory, the instructions being executable by the processor to:
     receive a request, sent from the one device, at the media multiplexer for a call by the one device;
     allocate communication channels on the media proxy, wherein a communication channel is allocated for each of the plurality of receiving devices;
     receive media from the one device by the media multiplexer;
     send the media received to each of the plurality of receiving devices using the allocated communication channels;
     receive at the media multiplexer a request for exclusive streaming by a previous receiving device of the plurality of receiving devices; and
     close all of the allocated communication channels except for the communication channel being used by the previous receiving device.

5. The media multiplexer of claim 4, further comprising instructions to receive callee media from the plurality of receiving devices via the allocated communication channels by the media multiplexer.

6. The media multiplexer of claim 5, further comprising instructions to send the callee media to the one device by the media multiplexer using the media proxy.

7. A method for communicating from one device to a plurality of receiving devices using a media proxy, comprising:
   receiving a request for a one-to-many call from a caller device to a plurality of callee devices;
   creating a caller port by a media multiplexer to receive media from the caller device;
   creating a receiving port to receive media from the plurality of callee devices;
   allocating a first port by the media multiplexer on a media proxy for sending media to the caller device;
   allocating a corresponding port by the media multiplexer on the media proxy for each of the plurality of callee devices that directs media to the media multiplexer;
   forwarding the request to each of the plurality of callee devices using the corresponding port for each callee device;
   answering the call by each of the plurality of callee devices using a port for receiving media on;
   allocating a respective port by the media multiplexer on the media proxy for each callee answer, wherein each respective port allocated is used to forward media to the associated callee device;
   allocating a second port by the media multiplexer on the media proxy, wherein the second port allocated directs caller media to the media multiplexer; and
   notifying the caller device of the second port on the media proxy to send media to the media multiplexer.

8. A media multiplexer for communicating from one device to a plurality of receiving devices using a media proxy, comprising:
   a processor;
   a memory in electronic communication with the processor; and
   instructions stored in the memory, the instructions being executable by the processor to:

receive a request for a one-to-many call from a caller device to a plurality of callee devices;
create a caller port by the media multiplexer to receive media from the caller device;
create a receiving port to receive media from the plurality of callee devices;
allocate a first port by the media multiplexer on a media proxy for sending media to the caller device;
allocate a corresponding port by the media multiplexer on the media proxy for each of the plurality of callee devices that directs media to the media multiplexer;
forward the request to each of the plurality of callee devices using the corresponding port for each callee device;
answer the call by each of the plurality of callee devices using a port for receiving media on;
allocate a respective port by the media multiplexer on the media proxy for each callee answer, wherein each respective port allocated is used to forward media to the associated callee device;
allocate a second port by the media multiplexer on the media proxy, wherein the second port allocated directs caller media to the media multiplexer; and
notify the caller device of the second port on the media proxy to send media to the media multiplexer.

* * * * *